US009353514B1

(12) United States Patent
Wine et al.

(10) Patent No.: US 9,353,514 B1
(45) Date of Patent: May 31, 2016

(54) BUILDING CONFIGURATION AND MANAGEMENT SYSTEM WITH RECONFIGURABLE BUILDING COMPONENTS

(71) Applicant: IVP Holdings III LLC, Bellevue, WA (US)

(72) Inventors: David Wine, Seattle, WA (US); Wei Yang, Bellevue, WA (US); Agnes Sauvage, Seattle, WA (US)

(73) Assignee: IVP Holdings III LLC, Bellevue, WA (US)

( * ) Notice: Subject to any disclaimer, the term of this patent is extended or adjusted under 35 U.S.C. 154(b) by 0 days.

(21) Appl. No.: 14/515,401

(22) Filed: Oct. 15, 2014

(51) Int. Cl.
*E04H 14/00* (2006.01)
*E04H 9/00* (2006.01)
*E04B 1/35* (2006.01)
*E04B 1/34* (2006.01)
*E04B 1/38* (2006.01)
*G05D 23/19* (2006.01)

(52) U.S. Cl.
CPC ... *E04B 1/35* (2013.01); *E04B 1/34* (2013.01); *E04B 1/38* (2013.01); *G05D 23/1917* (2013.01)

(58) Field of Classification Search
CPC ............... E04B 1/35; E04B 1/34; E04B 1/38; G05D 23/1917
USPC ............................................................... 52/1
See application file for complete search history.

(56) References Cited

U.S. PATENT DOCUMENTS

| | | | | |
|---|---|---|---|---|
| 8,037,644 B2 * | 10/2011 | Hall | H05K 7/20745 52/1 |
| 2007/0101660 A1 * | 5/2007 | Koncelik, Jr. | E06B 5/01 52/1 |
| 2010/0088970 A1 * | 4/2010 | Miller | E04C 2/296 52/1 |
| 2010/0235206 A1 * | 9/2010 | Miller | G06Q 10/063 705/7.11 |

* cited by examiner

*Primary Examiner* — Mark Wendell

(74) *Attorney, Agent, or Firm* — Ellen M. Bierman; Lowe Graham Jones PLLC

(57) ABSTRACT

Methods, systems, and techniques for building, maintaining, and/or renovating buildings using reconfigurable, intelligent, and/or communicating components and connectors are provided. These reconfigurable building components and connectors are configured to communicate with each other and with the internal structures and services of a building, using various protocols, for more efficient reconfiguration, management, and maintenance as well as safety. Examples provide a Building Configuration and Management System which provides a set of "smart" components, connectors, and protocols and a Building Control System that connects all internal building structures and services together in ways that allow them to communicate their location, state, and other information to each other and to other entities and to control them, potentially automatically. The BCMS facilitates, among other things, more efficient reconfiguration of these structures and services without demolition.

22 Claims, 13 Drawing Sheets

Wall Attachment Examples

Wall Attachment Examples

Wall Attachment Examples

BUILDING CONFIGURATION AND MANAGEMENT SYSTEM WITH RECONFIGURABLE BUILDING COMPONENTS

TECHNICAL FIELD

The present disclosure relates to methods, techniques, and systems for building and renovating buildings and, in particular, to methods, techniques, and systems for building using reconfigurable, intelligent, and/or communicating components and connectors to build and/or renovate commercial or residential premises.

BACKGROUND

Building internals, whether residential or commercial are not designed for easy installation or change. Interior reconfiguration typically requires the demolition of most internal partitions (such as walls, doors, and ceilings) and a complete redesign and rebuild. This wastes materials, time, and money. The expense of doing so often prohibits changes and upgrades that would otherwise provide significant economic, functional and social benefit to a building.

For example, fixtures, such as pipes, ductwork, floors, walls, ceilings, and the like require significant labor, time, and expense to install and change. Walls, floors, and ceilings are currently not designed or constructed to allow them to be easily moved, changed or replaced. One exception is some types of modular walls that can be used to create cubicles, cubicle environments, or movable partitions, for example, for dividing up an open or multi-use space. Cubicles or cubicle environments refer to offices or rooms that are created using cubicle or modular walls or dividers placed on an open floor where the walls of the office and/or room are formed using the cubicle dividers. Often these dividers are not the full height of a wall (i.e., they do not reach the ceiling) and thus offer little to no sound insulation due to their construction including the materials used. They also require significant time and cost to rearrange and connecting electrical power and other services to them can also be expensive.

Some floor systems also exist that offer the ability to manually install and re-route HVAC (heating, ventilation, and/or air conditioning), power, and/or data, but the floors themselves are not easily reconfigured or replaced once installed. Dropped ceilings (such as those that use acoustic tiles found in many office buildings) are also available to hide HVAC, power, etc., but are not reconfigurable once installed—they merely cover and allow access to the pre-existing fixtures and systems. One cannot change the configuration of the room and easily reroute the HVAC to maintain a healthy environment—the ductwork and other HVAC equipment must be moved and readjusted manually.

Thus, it is currently difficult to really know and track the internal configuration of a building once the building has been constructed. Floor plans for most constructed buildings capture the internal configuration at a particular point in time, but do not reflect changes or updates made to the walls and/or the building equipment. In many cases the floor plans and internal design documents are simply not kept updated. Also, the position and orientation of pipes, ductwork, electrical wiring, and other building fixtures may not be known accurately. There are many changes made during construction and renovation that are not documented because the changes occur on the fly during the construction process. This means that over time, the interior configuration of a building becomes less and less knowable to the owner, occupants, and the building, and often the floor plans and other design documents become severely outdated. This is true for both existing fixed and modular fixtures. This in turn leads to a complex and expensive 'discovery' process during renovations and maintenance and further deters upgrades and changes from being undertaken.

In addition, even if configuration information for a building is available, it is not usually kept in a format that can be shared with entities other than the ones responsible for the construction design or implementation, whether human or electronic.

BRIEF DESCRIPTION OF THE DRAWINGS

The patent or application file contains at least one drawing executed in color. Copies of this patent or patent application publication with color drawings will be provided by the Office upon request and payment of any necessary fee.

DETAILED DESCRIPTION

Figure 1:
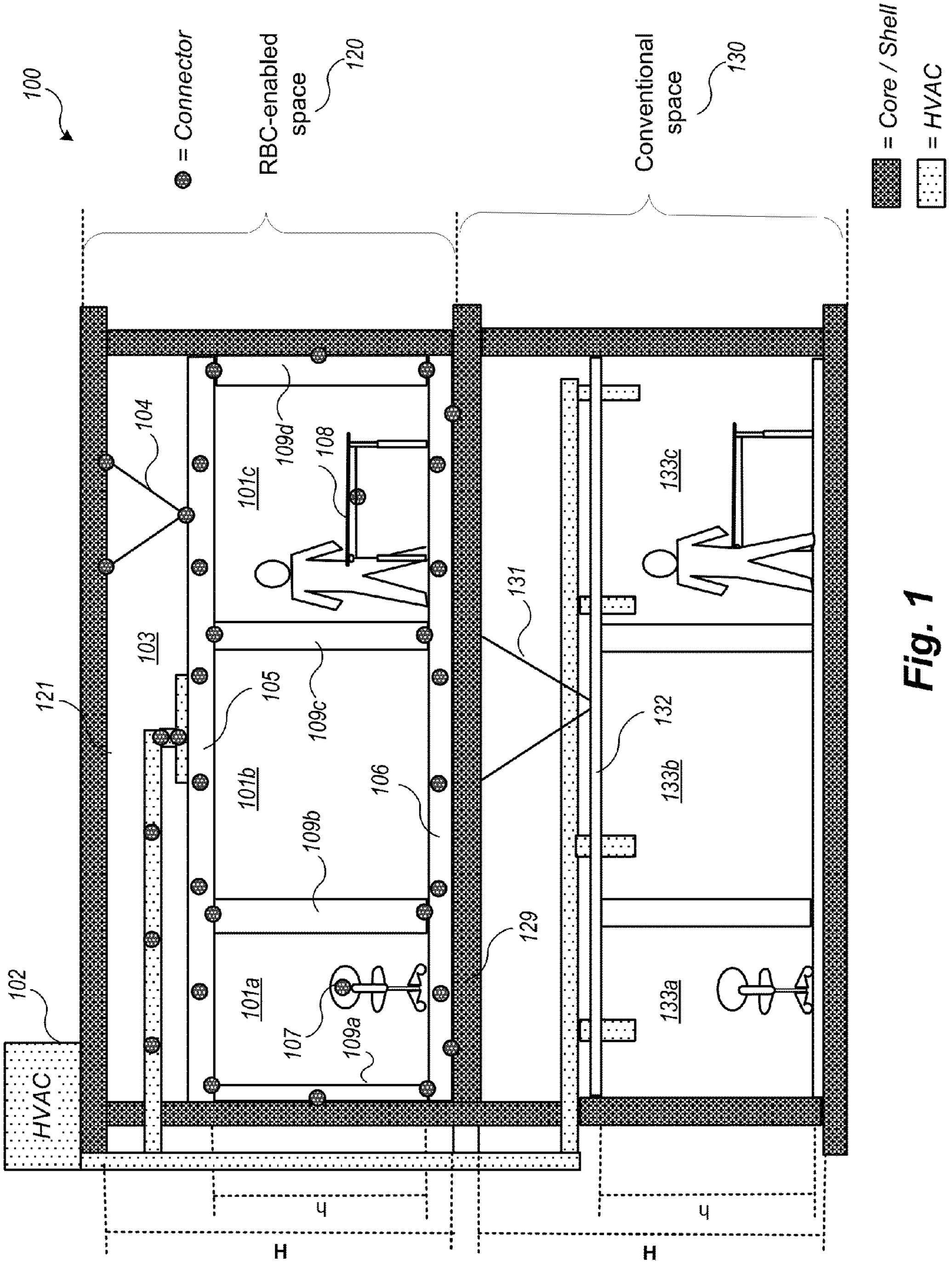
FIG. 1 is an example block diagram of an Reconfigurable Building Component-enabled (RBC-enabled) living space using an example Building Configuration and Management System.

Embodiments and examples described herein provide methods, techniques, and systems for building, maintaining, and/or renovating buildings using reconfigurable, intelligent, and/or communicating components and connectors. These reconfigurable building components and connectors are configured to communicate with each other and with the internal structures and services of a building, using various protocols, for more efficient reconfiguration, management, and maintenance as well as safety. For the purpose of this description, reconfigurable building components include interior components such as walls, ceilings, floors, and building service components such as ductwork, electrical wires, and the like. Using the techniques described herein, reconfigurable components can communicate with each other, with connectors, and with other components and control systems to reposition themselves, to report state information, reconfigure themselves in the event of an emergency, and the like. Existing protocols such as RFID, Bluetooth, and various IoT (Internet of Things) protocols, as well as new and other protocols, can be used by the components and connectors to effect communication.

Examples provide a Building Configuration and Management System ("BCMS"), which provides a set of "smart" components, connectors, and protocols and a Building Control System ("BCS") that connects all internal building structures and services together in ways that allow them to communicate their location, state, and other information to each other and to other entities. The BCMS facilitates, among other things, more efficient reconfiguration of these structures and services and uses of them that are not possible with current building component designs.

For example, the components/connectors of the BCMS enable a space to become "smart" and to intelligently respond to internal and external sensors, environmental information, human requests, scheduled activities such as meetings, etc. to meet the current needs for the interior space of a building as needed, requested or required. Walls, ceilings, and floors can be moved either manually or automatically (e.g., by themselves or by robots) and made to respond to a Building Control System (BCS) that unifies control of the components and connectors. Components such as walls may be configured with a device, such as a large-screen television, whiteboard, electrical outlet and automatically moved into position as needed. These devices may even be pre-installed so as to eliminate extra labor and time required to install or move the device at a future time. For example, a large screen television might require significant labor to mount initially, move to another wall, or remove for repair or replacement. Using the BCMS, the wall itself can be repositioned or replaced with a new wall that has an updated model of a television installed at the factory, saving both time and money. In some examples, other objects, such as desks, chairs, and other furnishings, may be enhanced to be "smart" objects and communicate with the other components of the space.

The BCMS can also maintain an awareness of the internal building configuration at any time (or at all times, real-time, near real-time, continuously, sporadically, or at predetermined times) and can analyze and compare the configuration with former configurations or internal or external data such as to enforce compliance with building code rules, safety metrics, customizations, intended use, etc. Moreover, the BCMS can analyze whether a proposed change or a current state is physically or logistically possible (or impossible or undesirable) given building codes, safety guidelines, and the like. When a desired change, movement, or update is analyzed and found to be outside or inconsistent with such codes or guidelines, the BCMS can notify those attempting to authorize or institute such change, movement, or update and even refuse to manipulate the affected components accordingly. Also, for example, by maintaining an awareness of position, age, and state of building components, the BCS can automatically schedule and conduct regular audits and inspection functions and thus limit the risk of missing an important safety breach caused by human error or from not being able to actually observe the state of a component through the building materials of an already constructed building.

In some situations, a space having such smart reconfigurable building components and/or connectors (an RBC-enabled space) can maximize building metrics, such as energy efficiency, based upon indoor climate sensors, comparison with outdoor sensors, personal preferences, and the like. Moreover, Building Energy Models (BEMs) and Building Information Models (BIMs) can be enhanced to incorporate data from the BCMS components and to work in a unified model, instead of as monolithic models.

More specifically, there are various existing systems for tracking the configuration of a building. For instance, a Building Information Model (BIM) is a CAD-based model of the building as the designers specify it. A Building Control System, or BCS (also known as the Building Management System, BMS), oversees the functioning of a building on a day-to-day level, for instance in controlling temperature seasonally. A Building Energy Model (BEM) is a theoretical model based on the BIM and local climate data that predicts energy usage. However these models today exist independent of each other and are not in general able to share information on a real-time basis, or update themselves based on changes in the actual building structure or contents. The RBC-enabled space allows these models to be enhanced to communicate with each other and to use data generated by the space in a dynamic fashion and to reflect current state of the space.

Further, RBC-enabled spaces can automatically and intelligently respond to emergency conditions such as fires or earthquakes. For example, a reconfigurable component such as an RBC-enabled wall with a door may be sufficiently intelligent to respond to the emergency by releasing or attaching itself from another wall, panel, or ceiling, so the door would not be stuck and trap people. Similar ideas for all of the BCMS components may be used to insure safety and egress in emergency conditions. They may also notify emergency personnel of conditions in a real-time manner when desired.

Thus, the intelligent components and intelligent connectors (referred to as intelligent or smart components and connectors) of an example BCMS can enable easy and cost effective:

- Configuration and Reconfiguration—walls can be moved to new locations based upon intended use or awareness, usage patterns, weather, costs, and many other factors
- Customization—spaces can be designed to conform with preferences, taste, cost, and business needs, taking into account building and fire code regulations;
- Reuse—wall, ceiling, and floor components can be re-used or sold intact without demolition;
- Early warning system implementation—when acceleration sensors are configured with the connectors (or components), they can actively sense loads, impacts, and motions of walls (and other components) in an absolute sense and relative to each other. They can also provide detection, vibration mitigation (such as in an earthquake), and emergency routing;
- Maintenance and other building services without human entry—automation of maintenance can be coordinated with a BCS and communicated to the components and services requiring the maintenance without anyone needing to enter the space, thereby providing privacy to the occupants; and
- Accommodation of large items without disassembly of items or demolition of surrounding walls—walls can have devices preinstalled and/or can be moved to accommodate entry of a new large device or object, such as a couch, piano, desk, chair, table, or other furnishings.

FIG. 1 is an example block diagram of an Reconfigurable Building Component-enabled (RBC-enabled) living space using an example Building Configuration and Management System. Space 100 shows both an RBC-enabled (living)

space 120 and a conventional space 130 for comparison purposes. The RBC-enabled space 120 includes a variety of intelligent (smart) components and connectors which define the space having three rooms 101*a*, 101*b*, and 101*c*. The smart connectors are indicated in FIG. 1 by the round circles on the structural elements, for example, wall 109*b*, as well as on fixtures in the room, such as chair 107 and table 108. With respect to fixtures, the smart connectors allow a Building Control System to detect where they are and other state information about them so as to identify, adjust, and accommodate them and/or the room environment as needed. For example, if chair 107 is moved into another room, the lighting in the other room can be automatically adjusted.

A building is typically constructed of a "frame"—core or shell components, such as the concrete floors, ceilings, and outer walls that make up the stories of a high-rise apartment complex. The internal walls, ceilings, and floors are built within these core/shell (C/S) components and typically result in a living space with a height "h" somewhat less than the maximal height "H" defined by the building core/shell. The space between the internal ceiling and the outer core/shell is referred to as the ceiling plenum. The space below the internal floor and the outer core/shell floor (not shown) is referred to as the floor plenum. These plenums are typically used for HVAC components 102, electrical support (not shown), and other building services. This is true for both the RBC-enabled space 120 and the conventional space 130. One difference is, however, that the addition of the smart connectors to things like the HVAC components allows such components to be moved or relocated after they are installed.

Each of the rooms 101*a*-101*c* of space 120 comprises multiple movable walls 109*a*-109*d*, a floor 106 with connectors that sits, is attached, or floats on the core/shell base 129 (for example, a concrete floor in an apartment complex). The outer walls 109*a* and 109*d* are shown as connected to the core/shell building walls and the inner walls 109*b* and 109*c* are shown as connected to a drop ceiling 105 and floor 106. As will be explained in greater detail elsewhere, each of the walls 109*a*-109*d* have mating connectors mounted on them or affixed to them that allow them to be moved or, in some cases to assist them to move themselves. The dropped ceiling 105 is attached by movable smart connector cables 104 so that the ceiling can be dropped or raised as needed or desired. Using adjustable ceilings such a ceiling 105 (and similarly floors such as floor 106), an RBC-enabled space 120 can be designed into a new space or retrofitted into an existing building space compromising very little of the available floor height (H) if desired.

In contrast to the RBC-enabled space 120, the conventional space 130 comprises three rooms 133*a*, 133*b*, and 133*c* with fixed walls and a fixed floor. Once the floors and walls are installed, they typically must be demolished in whole or in part in order to renovate the space. The conventional space 130 may support a dropped ceiling 132 held by cables 131, however, this ceiling cannot be raised or lowered automatically and is typically not movable without demolition type renovation.

Figure 2:
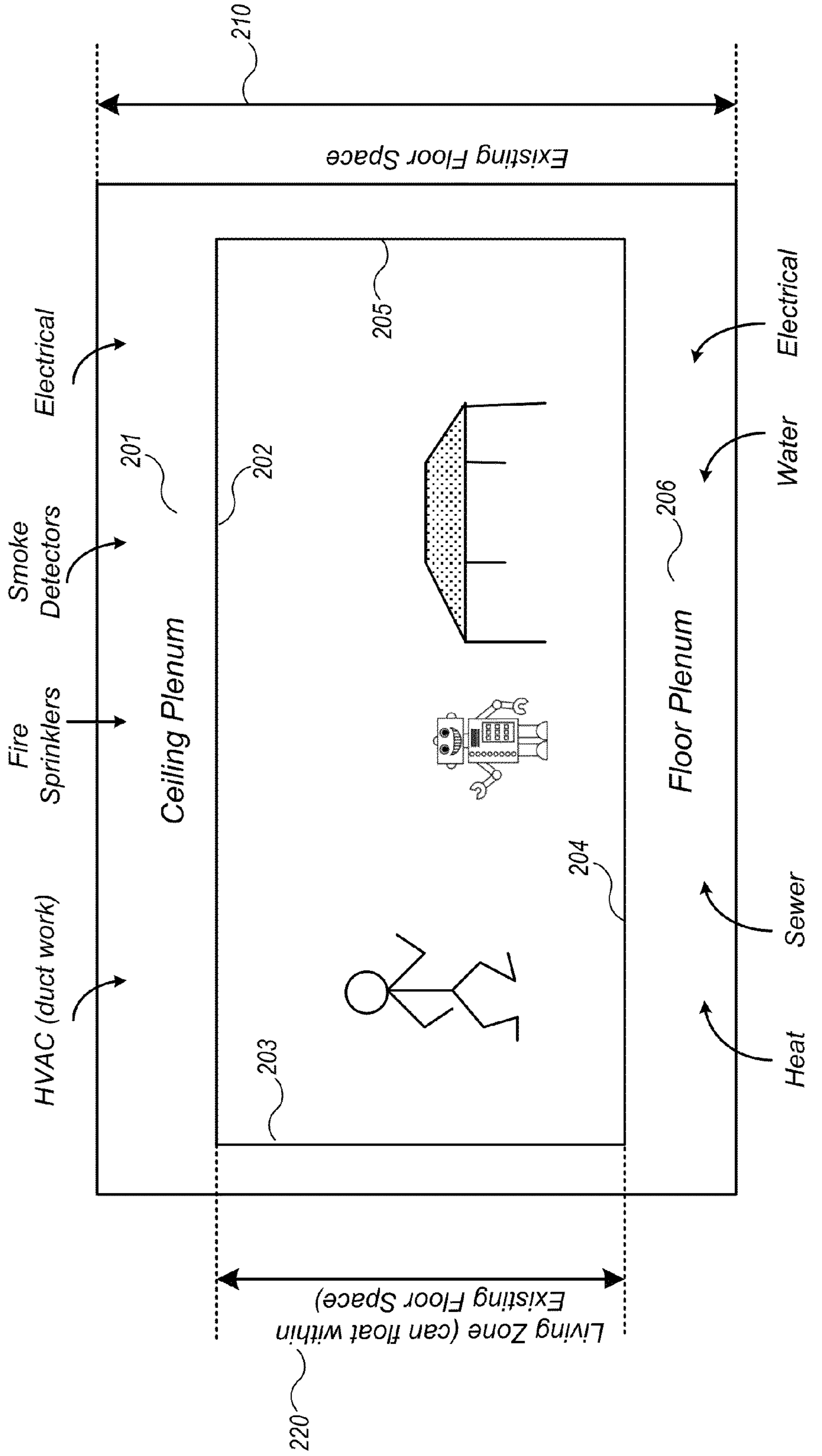
FIG. 2 is an example block diagram close-up illustration of how components of the BCMS can be arranged within an existing space to formulate an RBC-enabled space.

FIG. 2 is an example block diagram close-up illustration of how components of the BCMS can be arranged within an existing space to formulate an RBC-enabled space. As described with respect to FIG. 1, the existing space for a building floor is defined by the core/shell components, such as the concrete frame between building floors. The smart wall components 203 and 205 (only two of possibly many are shown), ceiling components 202, and floor components 204 are then placed within the existing floor space 210 to define a "living" zone (or office or other occupancy zone) 220. Within the ceiling plenum 201, HVAC, fire sprinklers, smoke detectors, electrical wiring, and the like can be placed and easily moved, as the ceiling component 202 can be moved (to create open space), raised, or lowered. Within the floor plenum 206, heat, sewer, water, electrical, and the like can also be placed and easily moved, as the floor component 204 can be moved (to create open space), raised, or lowered.

For example, in one use case, an office layout may change to temporarily accommodate an additional room that has a table that seats twenty people, to accommodate a meeting that only happens periodically (e.g, an annual board meeting). Since the meeting only happens on rare occurrences, it would be desirable to not "waste" the space in the office for the rest of the year. Using the BCMS, the organizers (or authorized users) can cause the office layout to be temporarily changed to accommodate the additional room with the required furnishings. Once the meeting is over, the room can be removed and the office returned to its prior configuration.

Although the examples discussed herein have referred to buildings of multiple stories, the techniques of a Building Configuration and Management System are generally applicable to any type of constructed building that can be occupied, the phrase "building" is intended to cover all kinds of buildings including high rise buildings, single story buildings, single family residences, multi-family residences, offices of any nature, etc. Also, although certain terms are used primarily herein, other terms could be used interchangeably to yield equivalent examples. For example, it is well-known that equivalent terms could be substituted for such terms as "smart," "intelligent," etc., for example, "automated," "without manual intervention," and the like. Specifically, the term "smart" can be used interchangeably with "intelligent," or with any of the above terms. In addition, terms may have alternate spellings which may or may not be explicitly mentioned, and all such variations of terms are intended to be included.

Examples described herein provide applications, tools, data structures and other support to implement a Building Configuration and Management System to be used for the configuration and reconfiguration of building spaces that can be occupied. Other examples of the described techniques may be used for other purposes. In the following description, numerous specific details are set forth, such as data formats and code sequences, etc., in order to provide a thorough understanding of the described techniques. The examples described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 3:
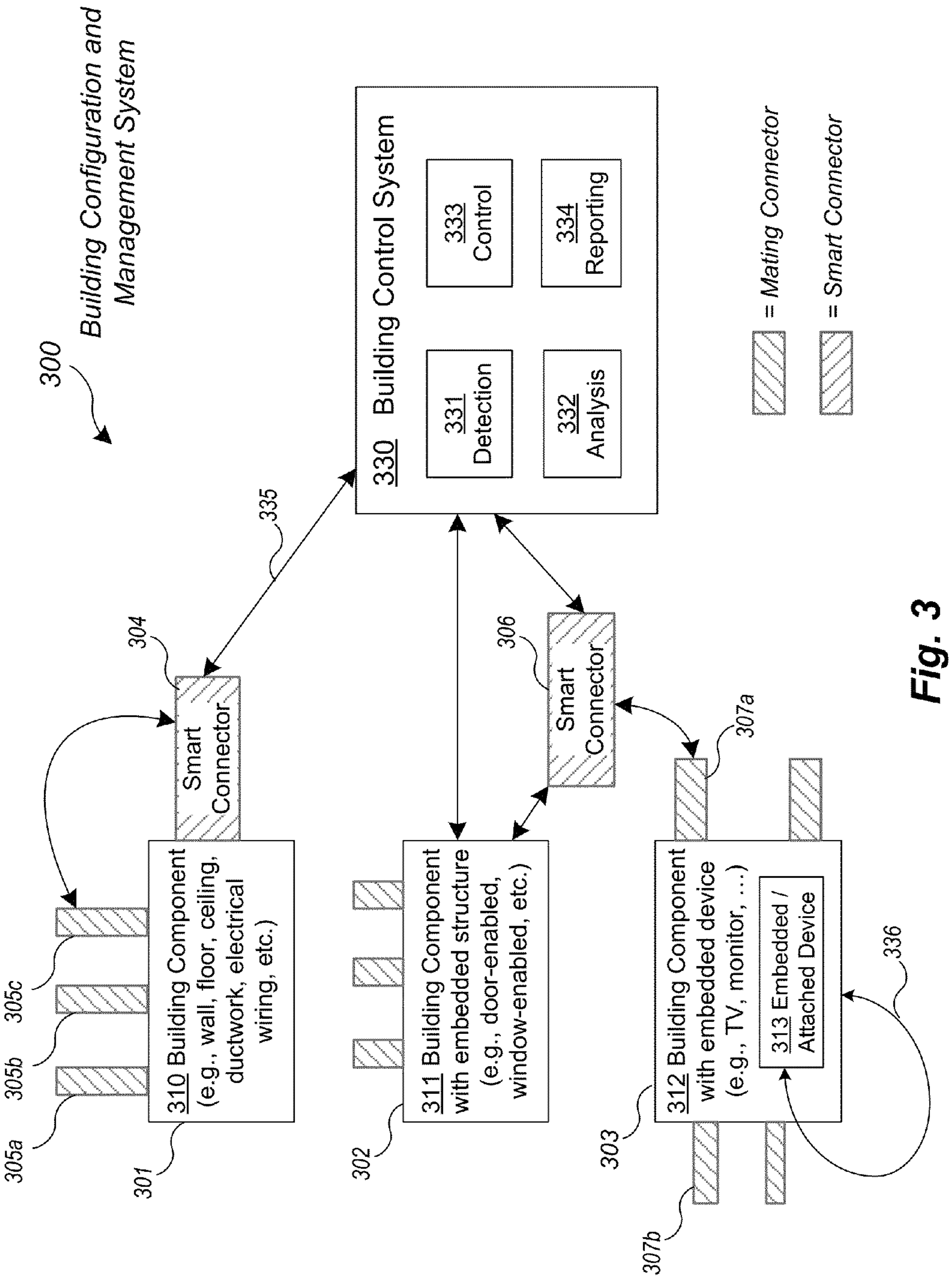
FIG. 3 is an example block diagram of components of an example Building Configuration and Management System.

In one example configuration, the Building Configuration and Management System comprises one or more functional components/modules that work together to provide an RBC-enabled space such as that illustrated in FIGS. 1 and 2. FIG. 3 is an example block diagram of components of an example Building Configuration and Management System. For example, an exemplary BCMS comprises a set of (smart, or intelligent) connectors that allow attachment of various interior partitions and components to the structural elements of a building and a set of protocols to allow continuous communication between the various components, connectors, and other building systems. These components include but are not limited to interior walls, floors, and ceilings, and building service components such as duct work and electrical wiring. In some examples the BCMS also includes a building control system (BCS) to manage the communications between the connectors and provide additional analysis and reporting functions.

As shown, an example Building Configuration and Management System 300 may comprise one or more physical components (internal building components) such as building components 310, 311, and 312, one or more smart connectors 304 and 305, and a building control system (BCS) 330. Each building component 310-312 may have one or more mating connectors (such as 305*a*-305*c*) which allows the component to physically connect to other components. Connectors are referred to as "mating connectors" when they are imbued with the capabilities of enabling their respective component to "mate" with another internal building component or the core/shell of the building.

Each of the physical components 310-312 become "smart" or "intelligent" components, respectively smart components 301, 302, and 303, when combined with the one or more "smart" connectors, such as smart connectors 304 and 306. These smart connectors may direct attachment or disengagement, provide feedback and/or data to the building control system 330, etc. Smart connectors may be mounted (affixed, joined, integrated, etc.) into the respective component, such as connector 304, or may be separate and discrete, such as connector 306. Smart connectors such as connectors 304 or 306 may be used to assist the (smart) components to attach using separate mating connectors (such as connectors 305*a*-*c*) or may also be used to form connections between components (they may encompass mating capabilities, (i.e., be mating connectors as well).

Smart connectors provide sufficient sensing, computational, and communication abilities to transmit their state information to other connectors, the BCS, software (part of the BCMS and/or external), and human occupants, etc., and can respond to commands given (forwarded, sent, etc.) by authorized users. For example, smart connectors mounted in walls (represented by smart connector 304) can attach to other connectors, sense when relative motion occurs, and detach as needed. Smart connectors mounted on a ceiling can recognize attachment points on the ceiling, extend cables or arms to grasp and/or release the internal ceiling and communicate with other ceiling connectors to lift or lower parts of the ceiling synchronously. Smart connectors could also respond to commands such as requests to improve acoustics from the BCS. The BCS would know what the current wall configuration is, analyze the acoustics, and send commands to such connectors to adjust wall positions to cancel standing waves or noise from other areas of the building.

In FIG. 3, building component 310 represents a wall, floor, ceiling, ductwork, electrical system, etc. which uses mating connectors 305*a*-305*c* to physically attach to other such building components and to the core/shell building structure (such as the outer walls). Building component 310 also has a mounted smart connector 304 to provide intelligence to the component and to ease its attachment and disengagement capabilities by communicating with mating connectors 305*a*-305*c* (in other examples, smart connector 304 may also serve as a mating connector). For example, the BCS 330 could request wall 310 to move using communications channel 335 to control smart connector 304. Wall 310 can have actuator mechanisms built into it, or could be moved by another device, such as a robot, that receives commands from the BCS and causes the wall 310 to move. Building component 311 represents a component such as 310 but with added embedded structure such as a door, window, or the like. This type of component may also have mating connectors as shown and attach to a discrete smart connector 306 to attach to other components (such as component 312 through mating connector 307*a*) or to communicate with the BCS 330. Building component 312 represents a component such as 310 but with an embedded or attached device or object 313. For example, a television, monitor, whiteboard, solar panel, WiFi, storage, ambient power, power outlets, environmental sensors are example devices that may be embedded into a building component. The embedded device may be capable of communicating with its enclosing component (e.g., a wall) by means of a device-to-device or device-to-server protocol via communications channel 336, such as an IoT (Internet of Things) protocol, Bluetooth, WiFi, etc.

The building control system 330 may be used to receive, analyze, and track the state of the set of connectors, and to send (forward, transfer, communicate, etc.) commands to the smart connectors as needed. For example, in an exemplary BCMS, the building control system comprises detection logic 331, analysis logic 332, control logic 333, and reporting logic 334. Other logic and/or modules may be implemented as desired. Also, the building control system 330 may be implemented as hardware, firmware, or software and may be a separate component or integrated into the building structure. For example, the detection logic 331 and the control logic 333 may be used to identify and command the set of ceiling smart connectors to raise and lower the ceiling, in parts or synchronously. In other cases, the detection logic 330 may be used to gather information, for example, regarding configuration, to respond to a request to improve the acoustics in a room. The BCS could then use its analysis logic 332, which may involve invoking external logic (code, software programs or control systems) to determine what components to move. The control logic 333 could then indicate commands to the appropriate smart connectors to change the configuration of the room or to other devices, such as robots, that can communicate with the appropriate smart connectors and move the components similarly.

Figure 4:
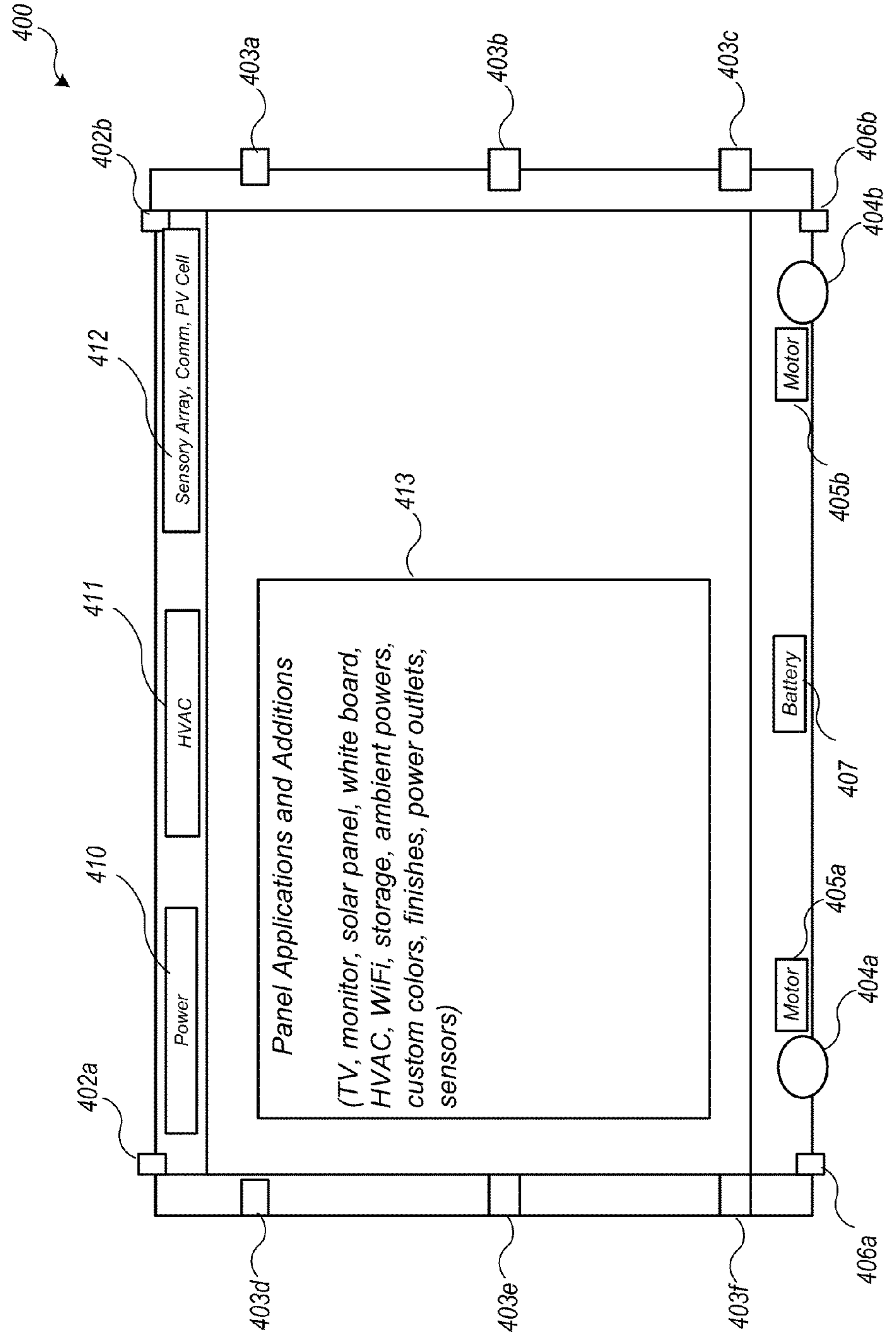
FIG. 4 is an example block diagram of details of an smart wall component of an example Building Configuration and Management System.

FIGS. 4 through 8 describe various aspects of attaching smart components to form an RBC-enabled space. FIG. 4 is an example block diagram of details of an smart wall component of an example Building Configuration and Management System. Smart wall component 400 has different arrangements depending upon application. In the application shown, the smart wall 400 contains a set of standard features and fixtures, including a set of mating (structural) connectors, including ceiling connectors 402*a* and 402*b*, wall connectors 403*a*-403*f*, and floor connectors 406*a* and 406*b*. Smart wall 400 also contains two wheels 404*a* and 404*b* with two respective motors 405*a* and 405*b* for controlling movement of the wheels. Battery 407 is used to power motors 405*a*-*b* and for powering any other aspects requiring power. There may also be various equipment to allow for balancing and steering while the wall is in motion. Each smart wall 400 may have a power attachment (connector, pipe, wire, etc.) 410, and HVAC attachment 411, and one or more of a sensory array, communications channel or device, PV (photovoltaic) cell or other means of receiving input or communicating. As noted with respect to FIG. 3, a smart wall may have an embedded device 413 or include an application such as being door or window-enabled. Example applications and additions include, for example, a television, monitor, solar panel, white board, HVAC, WiFi, storage, ambient powers, custom colors, finishes, power outlets, environment sensors, accelerometers, and the like.

Figure 5:
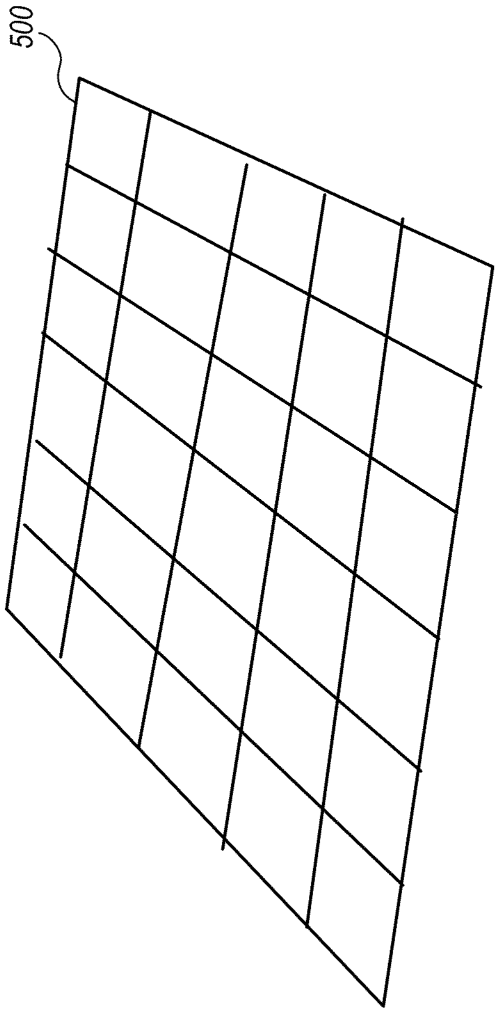
FIG. 5 is an example block diagram of an smart ceiling component used to connect to smart walls of an example Building Configuration and Management System.

FIG. 5 is an example block diagram of an smart ceiling component used to connect to smarts walls of an example Building Configuration and Management System. The lattice arrangement of the ceiling 500 can be used for connection of walls using mating connectors or smart connectors with mating capabilities. The lattice can be arranged to fit over the walls directly or hang from the core/shell ceiling using cables or the like. When a well-ordered structure like a lattice is used, rectangular or otherwise, robots can facilitate placement of the ceiling panels (the lattice) or movement of the wall or floor panels. Note that robots need not be limited to wheeled floor robots—other structures such as the ceiling cables themselves may have capabilities that allow them to function as and be considered robots.

Figure 6:
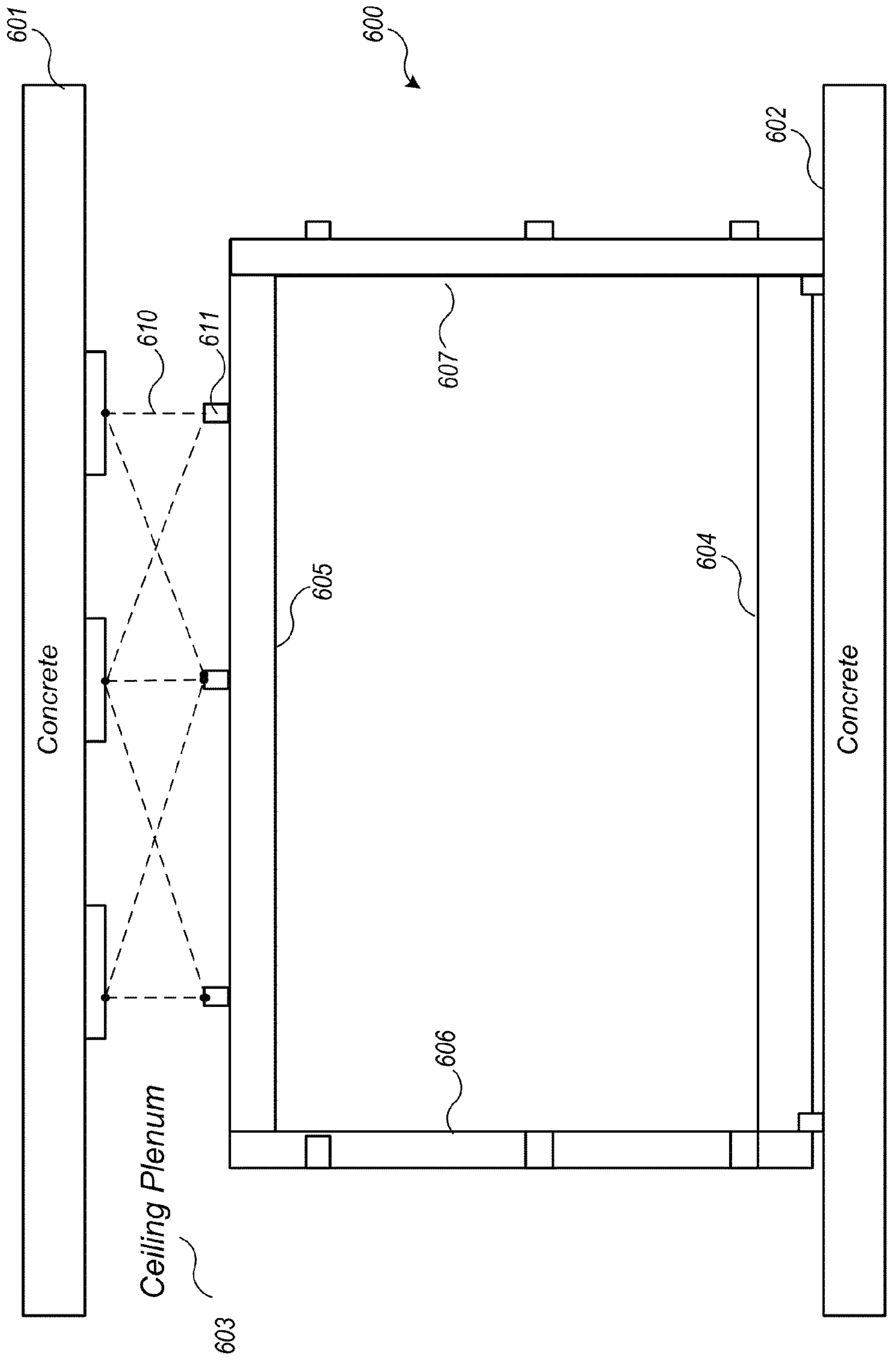
FIG. 6 is an example block diagram illustrating how smart components of an example Building Configuration and Management System can be attached to a core/shell ceiling in a moveable manner.

FIG. 6 is an example block diagram illustrating how smart components of an example Building Configuration and Management System can be attached to a core/shell ceiling in a moveable manner. Smart components 600, comprising a smart floor 604, two smart walls 606 and 607, and a smart ceiling 605 are attached to a concrete building shell 601 by means of a series of cables and/or pulleys 610. The system of cables and/or pulleys 610 resides in the ceiling plenum 603 as described earlier. These cables 610 can be attached to the smart ceiling 605 by means of smart connectors 611, so that the smart ceiling 605 can be instructed to move appropriately by the BCS. Similarly, in some examples, the smart floor 604 may be attached through a system of pins, posts, or other connectors, to the concrete base 602. In some examples, other techniques for connection other than those mentioned may be incorporated, as long as there is a way to raise and lower either a portion of the ceiling (or floor) or the entire ceiling (or floor) at once or in other defined increments. For flexibility, it may be important to assemble or install the various smart components in some order, for example, ceiling first, then floor, then walls. Other orderings may provide different benefits or disadvantages.

Figure 7A:
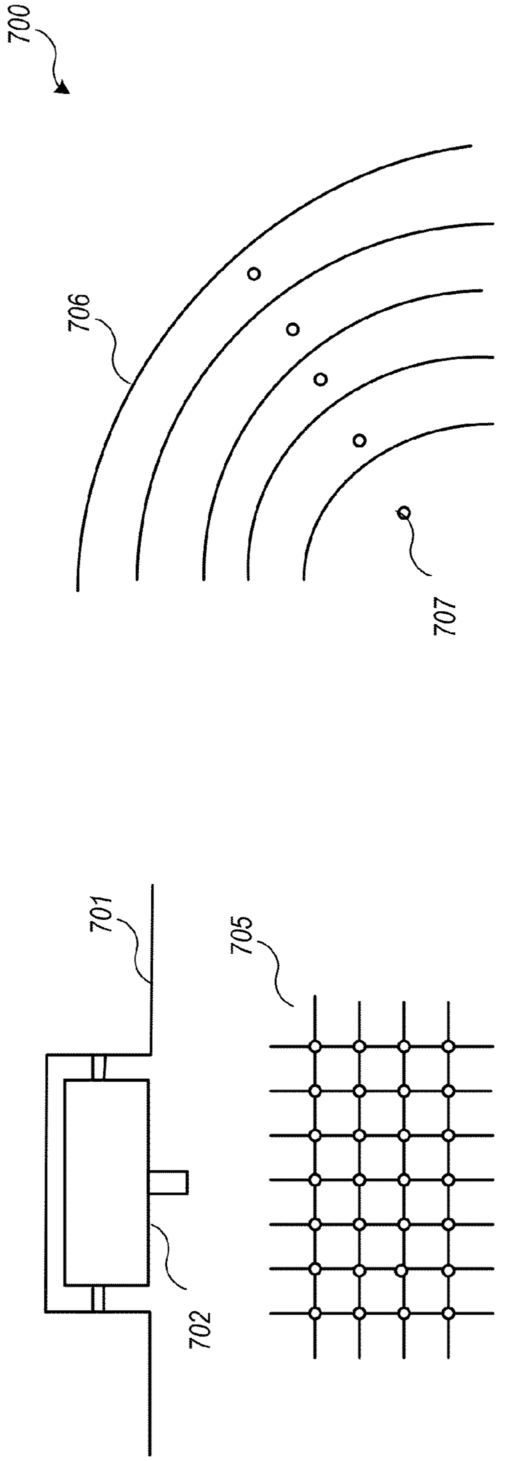
FIGS. 7A-7C are example block diagrams illustrating different example techniques for attaching smart wall components to one another and to other components of a Building Configuration and Management System.
Figure 7B:
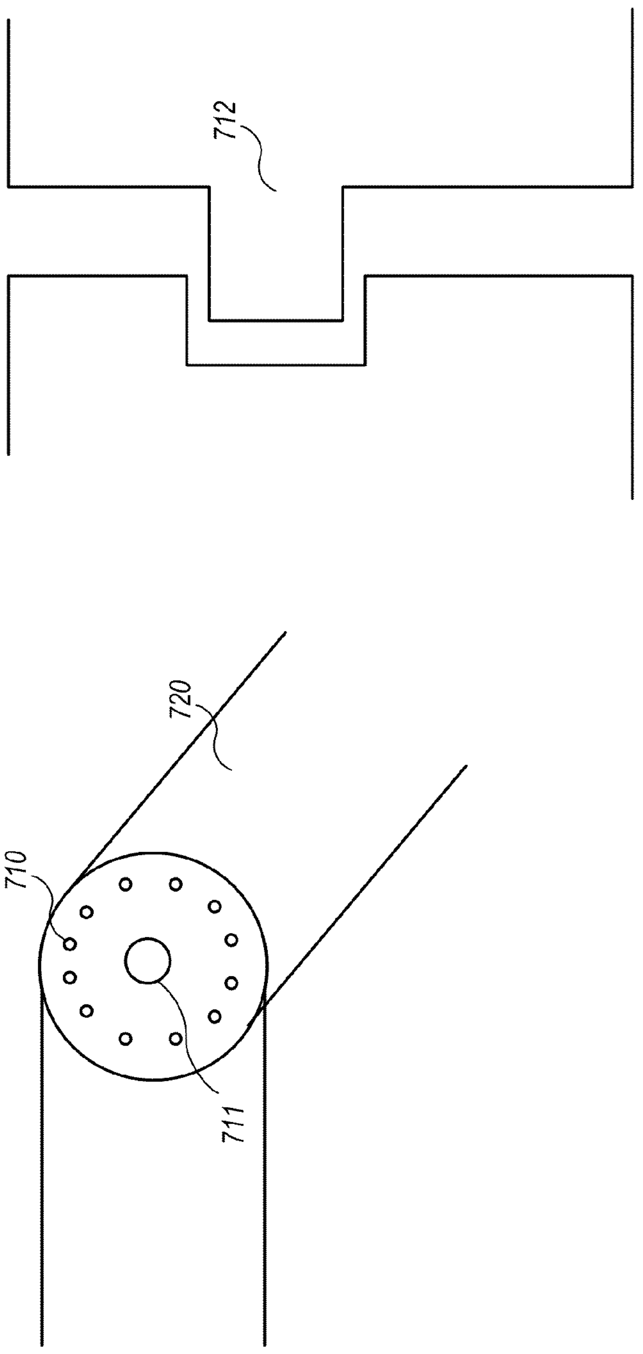
Figure 7C:
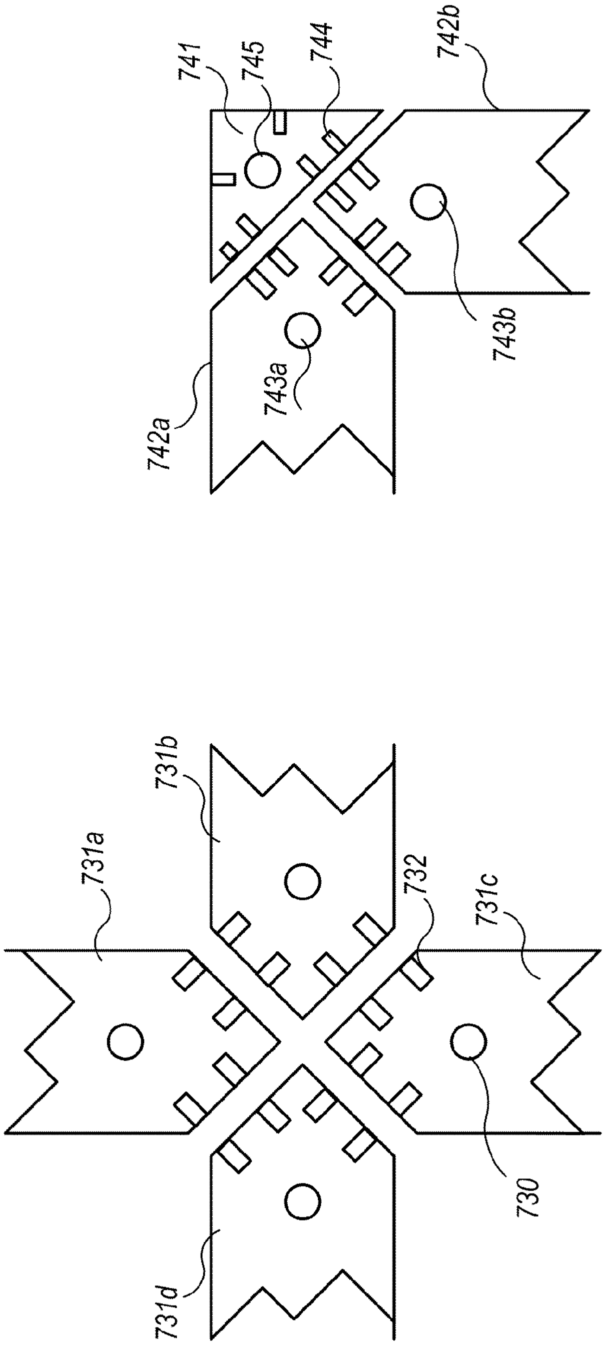

FIGS. 7A-7C are example block diagrams illustrating different example techniques for attaching smart wall components to one another and to other components of an example Building Configuration and Management System. FIG. 7A shows a locking system of mating connectors. Mating connector 702, mounted into a smart component (portion shown as) 701, has a protrusion which can be inserted easily into corresponding holes (or other receptacles) in a lattice framework such as lattice 705. Either a ceiling or floor may be outfitted with a lattice such as lattice 705. In order to move component 701 horizontally, the component simply needs to be shifted over some number of holes (up, down, left, or right, depending upon the application). Also, the inline connectors between 701 and 702 are meant to be fine-adjustments that can self-align the protrusion based on tolerances and other manufacturing variations. A variation of wall attachment is illustrated in FIG. 7A where, instead of the lattice 705, the receptacle holes 707 are instead arranged in a radial format 706. Such an arrangement may be useful, for example, with radial floor tiles in a round room. Other variations of hole arrangements may be also useful depending on the layout desired.

FIG. 7B illustrates a rotating collar connection 711, and a tongue and groove type of arrangement 712. In the rotating collar connection 711, the holes are indexed so that commands to move a connecting component move some number of index points. A center post 711 may be inserted for lateral strength and for sensing torsion load on a component (e.g., from an earthquake).

FIG. 7C illustrates a triangular connection, where mating connectors are used to match sides of other integrated mating connectors or a separate discrete smart connector. For example, components 731*a*-731*d* can be arranged and joined by attaching corresponding mating connectors (e.g., connector 732) with each other. A smart sensor/communication device 730 residing on each component can be used to control movement, report state information, etc. As a variation, components 742*a* and 742*b* can be joined together using a separate triangular smart connector 741. The sensor/communication device 745 on the triangular smart connector 741 communicates with corresponding sensors/communication devices 743*a* and 743*b* to effect the attachment with respective components 742*a* and 742*b*. Integrated mating connectors, such as Connector 744, may be structured to mate with corresponding mating connectors on the components 742*a* and 742*b*.

Other types of connectors, including ones that employ electrical, mechanical, magnetic, or solar power can be similarly incorporated to join components of an BCMS.

Figure 8:
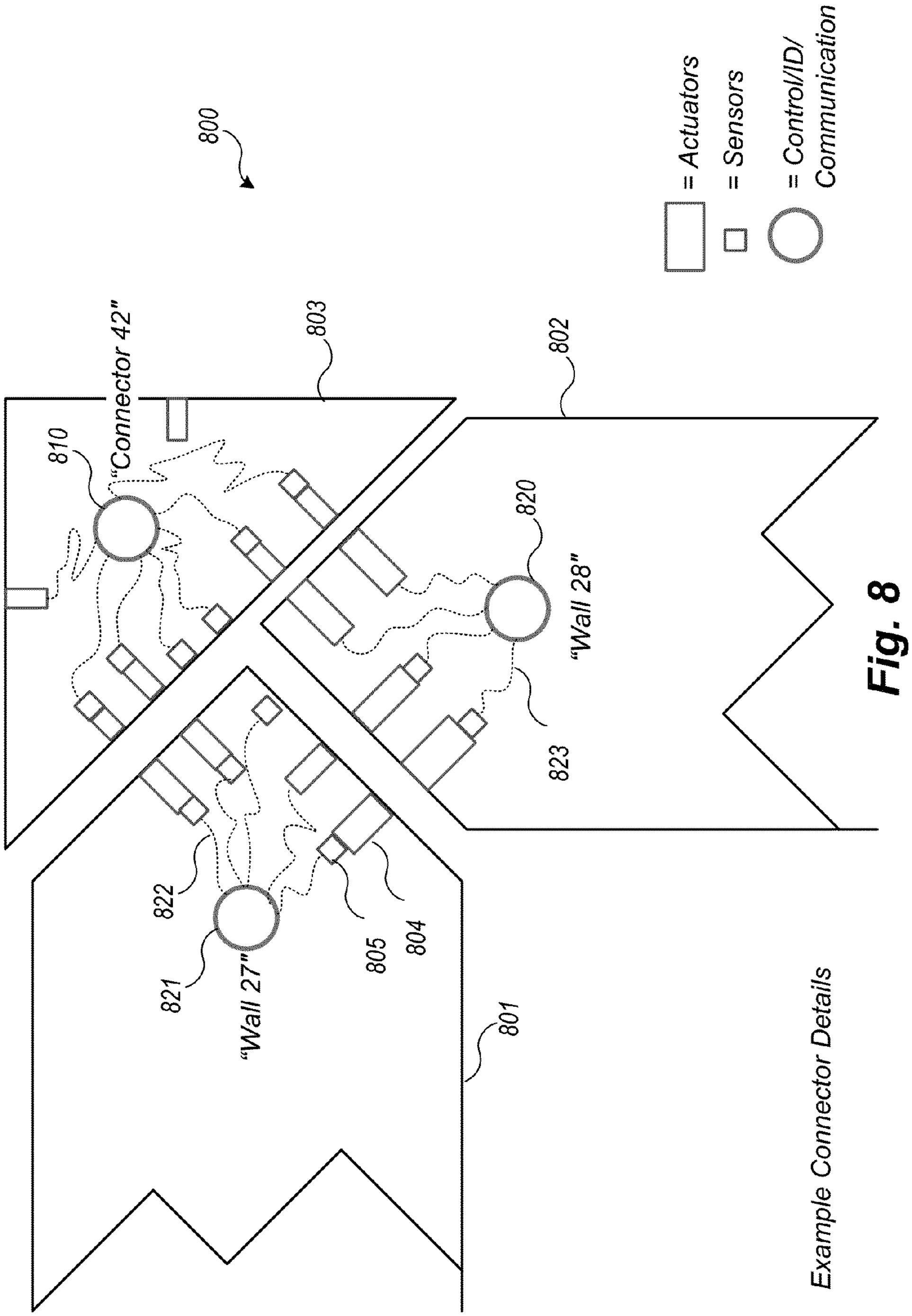
FIG. 8 is an example block diagram illustrating details of a smart connection of an example Building Configuration and Management System.

FIG. 8 is an example block diagram illustrating details of a smart connection of an example Building Configuration and Management System. The smart connection 800 shown is similar to use of the triangular smart connector illustrated in FIG. 7C with more detail. Specifically, two walls 801 ("wall 27") and 802 ("wall 28") are shown connected to triangular smart connector 803 ("connector 42") in smart connection 800. Each smart component, for example, wall 27 (801), has a control and communication control processor 821 (device, apparatus, control, etc.), capable of communicating the identification of the wall and state information to and accepting commands from a BCS, such as BCS 330 of FIG. 3. Each smart component, such as wall 801 and 802, have mounted, or otherwise integrated, one or more actuators 804, which connect to one or more sensors 805. The actuators (shown in blue) may be electrical, solenoid based, mechanical, hydraulic, pneumatic, or the like. The sensors (shown in red) may be acceleration, optical, auditory, thermometer, or other sensors. RFID tags or bar codes (not shown) may also be present on the components and connectors for easy identification or other functions.

Control processor 821 communicates to other control processors over communication channels 822 and to the BCS (not shown), using, for example, protocols such as WiFi, Bluetooth, IoT protocols, and the like. In some scenarios, different communication links are provided to communicate with other components and connectors versus the BCS. The control processor, e.g., control processor 821, is capable of providing a distinct identity for the respective component, such as an RFID tag or a MAC address, and has enough processing power to analyze sensor data received from sensors 804 and is able to command actuators 805. Control processor 820 performs similar functions for wall 28 (wall 802), and communicates over communication lines 823 and contains all or a portion of the same features as control processor 821. Control processor 810 performs similar functions for its respective connector 803.

Each smart component, such as wall 801, can detect when a particular actuator is engaged and to which other component, such as wall 802 and connector 803. Thus, for example, wall 801 could contact wall 802, either directly or through the BCS (or the connector 803) and request connection. The individual actuators would then align and attach to each other, securing the physical connection. Depending upon the desired configuration, the BCS would either direct wall 802 to connect and receive confirmation of completion or send a separate connector piece (such as discrete smart connector 803) to mate with both wall 801 and 802. The connector piece 803 could move autonomously or be moved using other devices, such as robots. Other formulations and combinations for control are possible depending also upon how much intelligence is programmed into the processors of the smart components. So, for example, as walls 801 and 802 are positioned, some of the sensors 805 capture the state of the walls so that if acceleration, passing objects, and the like affect the positioning, one of the control processors of the affected walls can communicate to the BCS that "Wall 27: I've just been bumped" and provide location or other state information as appropriate.

Figure 9:
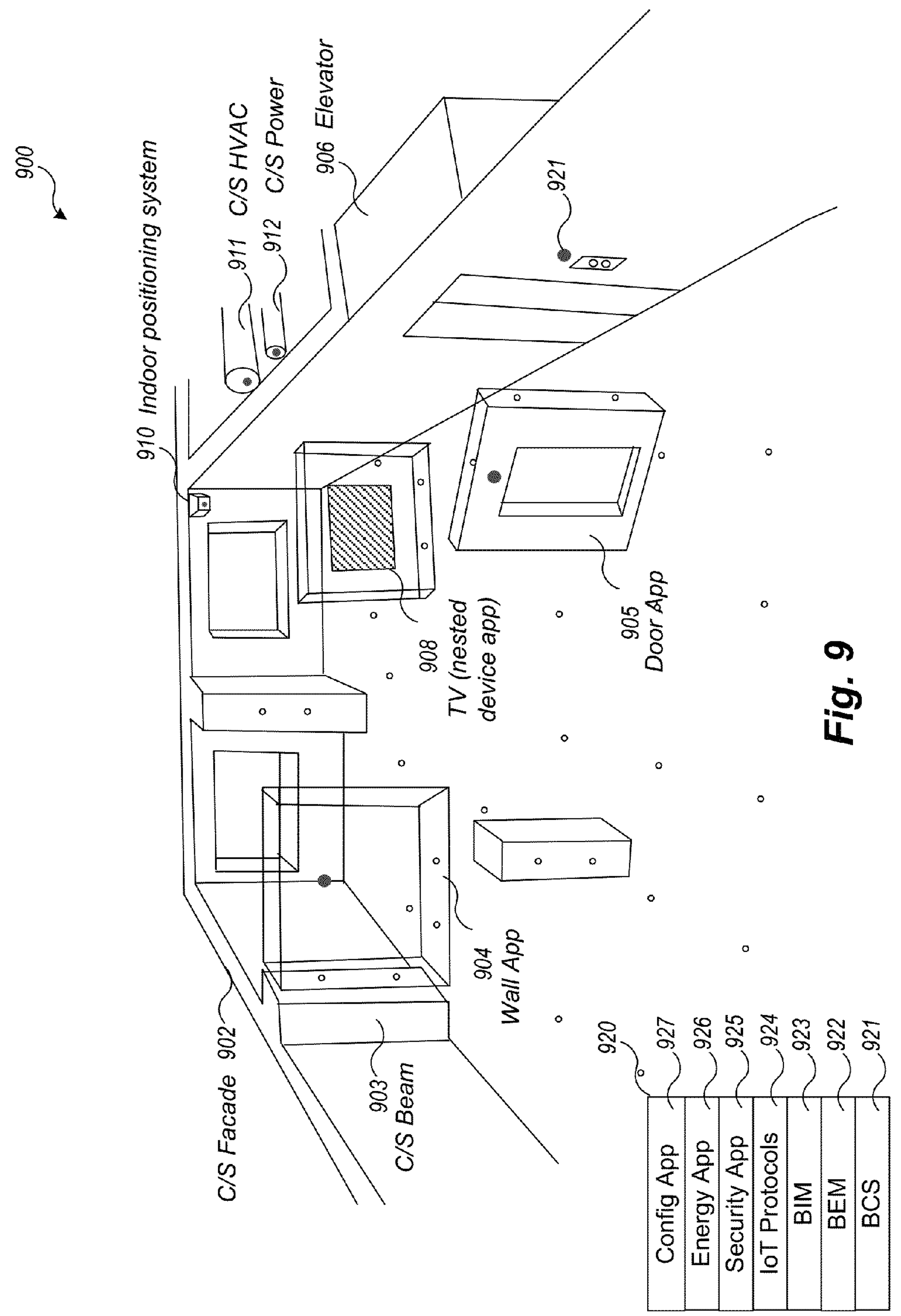
FIG. 9 is an example block diagram of an example room configured with reconfigurable and intelligent components and connectors of an example Building Configuration and Management System.

FIG. 9 is an example block diagram of an example room configured with reconfigurable and intelligent components and connectors of an example of a Building Configuration and Management System. FIG. 9 shows a built out example of the components and smart connections described, and indicates the software applications that are involved to build a system that can be positioned and is controllable by a BCS, such as BCS 330 of FIG. 3. For example, RBC-enabled room 900 is formed by the core/shell (C/S) components provided by the building, for example façade 902 and beams 903, to which the smart components attach and can be reconfigured. Elevator 906 in some scenarios may be provided externally and in others be part of the smart component system. The building also typically supplies HVAC 911 and power 912 to the building, which is routed by means of smart components (e.g., ductwork and wiring not shown) to and through the smart components.

Room 900 shows a smart wall 904 being positioned and controlled using a wall application and a smart wall with an embedded device 908 being positioned and controlled using a nested (or embedded) device application. It also shows a smart wall that is door enabled 905 being positioned and controlled by a door application. As described elsewhere with respect to the figures, other arrangements of walls are contemplated. The "dots" on the floor component indicate positions (mating connections) where the walls, such as walls 905, 905, and 908 can be placed. The red dots indicate smart connectors that have been placed strategically on the components (whether BCMS or core/shell provided) to assist in placement and control. Of note, the figure shows one on smart walls 903 and 905, on the HVAC ducts 911 and power channels 912 and on the elevator control 921. These connectors (which their respective control processors) can be used to report state information, control the actuators of their respective smart components, and receive commands from a BCS. Room 900 also contains an indoor positioning system 910, with its own smart connector (and control processor) to aid in the positioning and control of component placement in the room, whether done by the component directly or using an external agent such as a robot.

The software applications provided for control of the room 900 and implemented or integrated by a BCS are listed in table 920. As mentioned they may be provided by firmware supplemented by external models. Controlling the entire software applications and models is the BCS 921. On top of the BCS, table 920 shows integration of a building information model 923 (BIM, supplied externally by, for example, building construction company), a building energy model 922 (BEM, supplied externally by, for example, building construction company), the IoT protocols 924 used by the components and connectors, a security application 925, an energy application 926, and a configuration application 927. More or less applications and/or models may be desirable for control of a room.

Figure 10:
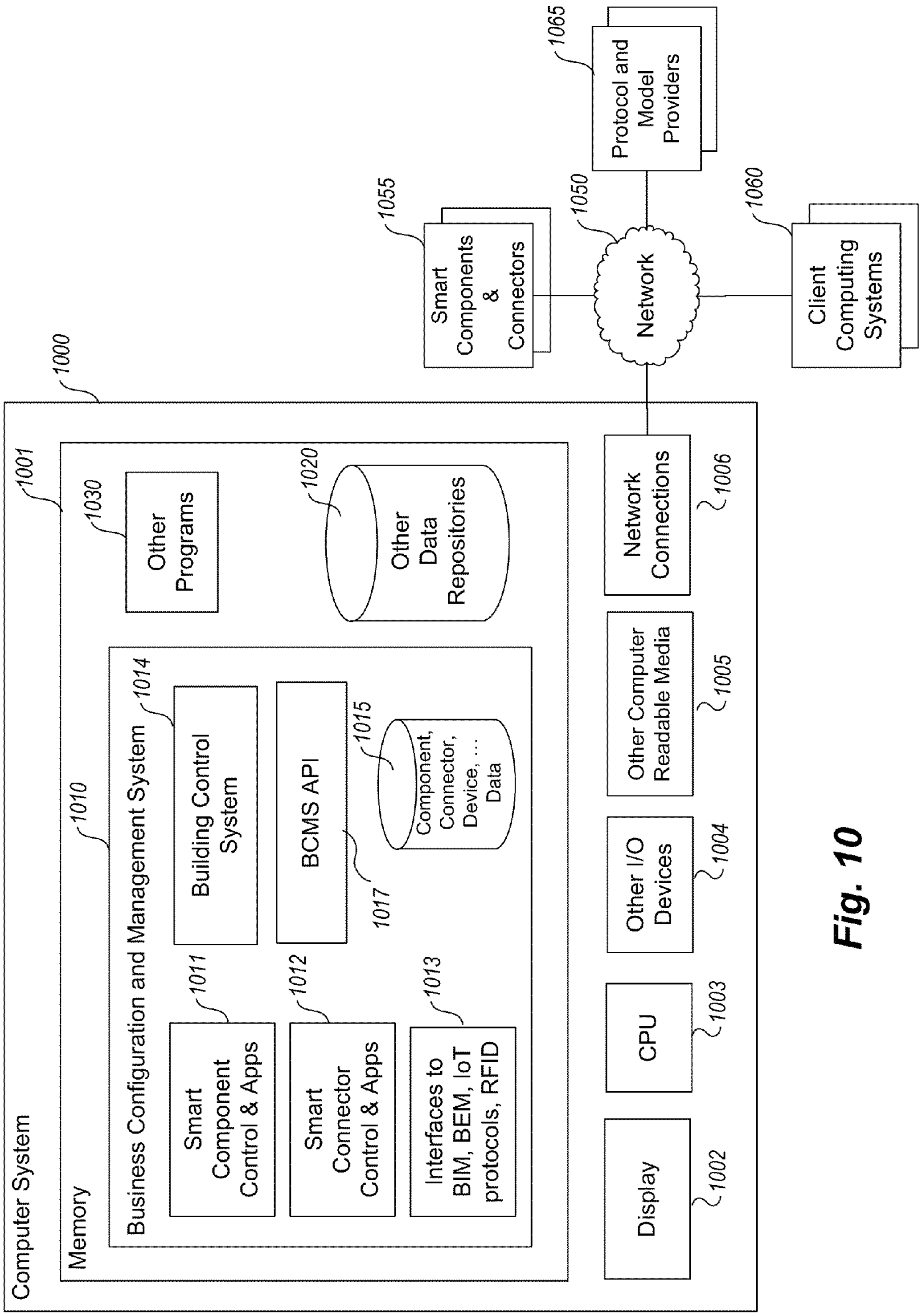
FIG. 10 is an example block diagram of a computing system for practicing examples of an example Building Configuration and Management System.

FIG. 10 is an example block diagram of a computing system for practicing examples of an example Building Configuration and Management System. Note that one or more general purpose virtual or physical computing systems suitably instructed or a special purpose computing system may be used to implement an BCMS including a BCS. Further, portions of the BCMS may be implemented in software, hardware, firmware, or in some combination to achieve the capabilities described herein.

The computing system 1000 may comprise one or more server and/or client computing systems and may span distributed locations. In addition, each block shown may represent one or more such blocks as appropriate to a specific example or may be combined with other blocks. Moreover, the various blocks of the BCMS 1010 may physically reside on one or more machines or devices (including the smart components and connectors 1055), which use standard (e.g., TCP/IP, IoT, Bluetooth, or WiFi) or proprietary interprocess communication mechanisms to communicate with each other.

In the example shown, computer system 1000 comprises a computer memory ("memory") 1001, a display 1002, one or more Central Processing Units ("CPU") 1003, Input/Output devices 1004 (e.g., keyboard, mouse, CRT or LCD display, etc.), other computer-readable media 1005, and one or more network connections 1006. The BCMS 1010 is shown residing in memory 1001. Notably, because the software/firmware to control the components and connectors is likely distributed across many components, what is shown as BCMS 1010 is representative of this software/firmware to represent the collection of all intelligence necessary to detect, control, and communicate with all of the components and connectors.

In other examples, some portion of the contents, some of, or all of the components of the BCMS 1010 may be stored on and/or transmitted over the other computer-readable media 1005. Some of the components of the BCMS 1010 preferably execute on one or more CPUs 1003 and manage the configuration and reconfiguration and maintenance of one or more smart components and connectors, as described herein. Other code or programs 1030 and potentially other data repositories, such as data repository 1006, also reside in the memory 1001, and preferably execute on one or more CPUs 1003. Of note, one or more of the components in FIG. 10 may not be present in any specific implementation. For example, some examples may not provide means for user input or display.

In a typical example, the BCMS 1010 includes one or more smart component control and applications 1011, one or more smart connector control and applications 1012, interfaces to external models and protocols such as BIM, BEM, IoT, etc. 1013, a building control system 1014, and an API 1017 for access to BCMS functions and data. In at least some examples, the BCS 1014 may include the other component s 1011, 1012, and 1013. Other and/or different modules or components of the BCMS may be implemented. In addition, the BCMS 1010 may interact via a network 1050 (or other communication channels as described herein) with the smart connectors and components 1055 (e.g., the walls, etc.), one or more client computing systems 1060, and/or one or more third-party information provider systems 1065, such as the purveyors of the BIM and BEM models. Also, of note, the data repository 1015 which holds the RMBS data may be provided external to the BCMS as well, for example in a knowledge base accessible over one or more networks 1050.

In an example, one or more components/modules of the BCMS 1010 are implemented using standard programming techniques. For example, the BCMS 1010 may be implemented as a "native" executable running on the CPU 103, along with one or more static or dynamic libraries. In other examples, the BCMS 1010 may be implemented as instructions processed by a virtual machine. A range of programming languages known in the art may be employed for implementing such example examples, including representative implementations of various programming language paradigms, including but not limited to, object-oriented, scripting, and declarative.

The examples described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some examples may execute concurrently and asynchronously and communicate using message passing techniques. Equivalent synchronous examples are also supported.

In addition, programming interfaces 1017 to the data stored as part of the BCMS 1010 or BCS 1014 (e.g., in the data repository 1015) can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 1015 may be implemented as one or more database systems, file systems, or any other technique for storing such information, or any combination of the above, including implementations using distributed computing techniques.

Also the example BCMS 1010 may be implemented in a distributed environment comprising multiple, even heterogeneous, computer systems and networks. Different configurations and locations of programs and data are contemplated for use with techniques of described herein. In addition, the BCMS may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated examples in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an RMBS.

Furthermore, in some examples, some or all of the components of the BCMS 1010 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other examples. Accordingly, examples of this disclosure may be practiced with other computer system configurations.

As described, the Building Control System of the BCMS (the BCS) is the center controller for controlling the various smart components and connectors.

Figure 11:
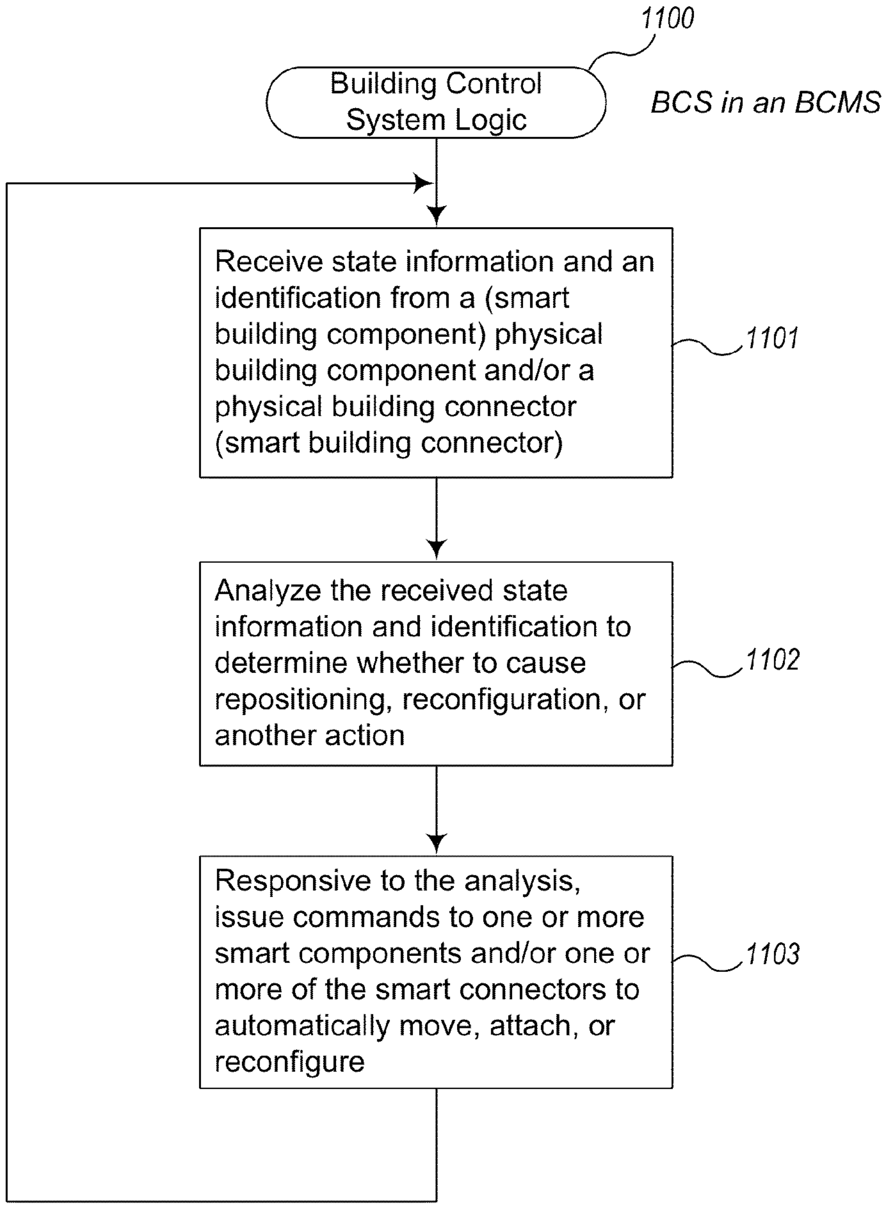
FIG. 11 is an example flow diagram of example logic provided by a Building Control System to manage and/or control reconfigurable components and connectors.

FIG. 11 is an example flow diagram of an example logic provided by a Building Control System to manage and/or control reconfigurable components and connectors. This logic can be executed for example, by a building control system 330 of FIG. 3 to maintain and control one or more physical building components, such as smart components 301, 302, and 303. The BCS may perform these activities in a fully automated fashion (without human intervention to perform the acts) or in a semi-automated fashion, for example, where an authorized user issues instructions to be carried out by the BCS.

In one example BCS, in block 1101, the BCS receives state information from one or more of the smart components (e.g., walls, ceiling, floor, duct work, power channels, data channels, etc.) and/or from one or more of the smart connectors. As described elsewhere herein, this information includes an identifier of the source of the information (e.g., wall "27") and an indication of state, for example, position, impedance information, desired attachment, embedded device information, etc. The information may also be in any form including electrical, solenoid based, mechanical, hydraulic, pneumatic, and/or sensor information, including for example acceleration, optical, auditory, thermometer, or other sensor information. Identification may be in any form including RFID tags, MAC addresses, and/or bar codes.

Information may be received by the BCS using one or more of a multiplicity of types of communication channels and protocols, including for example, HTTP, WiFi, Bluetooth, IoT, RPCs, TCP/IP, etc.

In block 1102, the BCS analyzes the received identification of one or more smart components and/or connectors and the received state information to determine what needs to be done. For example, the BCS may determine that an emergency has arisen and therefore there is a need to contact outside emergency personnel. Or, the BCS may determine that the identified smart component or connector desires to attach somewhere or reposition or reconfigure itself or some other smart component or embedded device.

The analysis may take into account external models such as a BIM, BEM, energy application, security, power models, and the like, received possibly from external (third party) sources. The analysis may cause various computations to be performed.

In block 1103, once the BCS has determined what is needed (if anything) in response to the received data (state information and identification), then the BCS issues one or more commands as appropriate to one or more of the smart components and/or smart connectors. As explained earlier, these commands in some cases may be sent directly to the components and in other cases through a smart connector. Other actions are also possible to be performed by the BCS logic.

From the foregoing it will be appreciated that, although specific examples have been described herein for purposes of illustration, various modifications may be made without deviating from the spirit and scope of the invention. For example, the methods and systems for providing reconfigurable building components discussed herein are applicable to other applications other than concrete buildings, large residential complexes, etc. For example, they may still be used for offices or single family residences. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A building configuration and management system, comprising:

a plurality of physical components capable of forming a plurality of parts of a building interior, the plurality of parts of the building interior including a plurality of movable interior walls that are separate from a shell of a building and capable of being automatically repositioned, each physical component including one or more physical mating connectors structured to physically connecting automatically to one or more other of the plurality of physical components in response to logic instructions;

a plurality of smart connectors, each smart connector including a control processor configured to cause one or more of the plurality of physical components to attach to each other or reposition themselves to form a portion of a space in the building interior; and wherein the plurality of physical components and the plurality of smart connectors are responsive to logic instructions configured to detect state information of each of the plurality of physical components including position information of at least some of the plurality of physical components and to send control commands to one or more of the plurality of physical components and/or the plurality of smart connectors to automatically cause the one or more of the plurality of physical components to attach to each other or to reposition themselves using the physical mating connectors to form the portion of the space.

2. The system of claim 1 wherein the state information includes one or more of a presence, a position, and/or an identification of a physical component or a smart connector.

3. The system of claim 1 wherein the plurality of physical components include at least an interior building ceiling.

4. The system of claim 3 wherein the interior building ceiling comprises movable dropped ceiling portions that are raised or lowered automatically.

5. The system of claim 4 wherein the movable dropped ceiling portions are raised or lowered together.

6. The system of claim 4 wherein the movable dropped ceiling portions are raised or lowered in parts.

7. The system of claim 3 wherein the interior building ceiling is connected to a building shell ceiling by movable cables so as to enable configuration and reconfiguration of one or more of HVAC, power, electrical, and/or fire protection in a ceiling plenum between the interior building ceiling and the building shell ceiling.

8. The system of claim 1 wherein the plurality of physical components include at least an interior building floor.

9. The system of claim 8 wherein the interior building floor floats on a building shell floor so as to enable configuration of one or more of heat, HVAC, and/or wiring in a floor plenum between the interior building floor and the building shell floor.

10. The system of claim 1 wherein the plurality of physical components are equipped with one or more of a door, window, embedded device, or an object.

11. The system of claim 10 wherein the plurality of physical components are equipped with an embedded device and wherein the embedded device is one or more of a television, a monitor, a solar panel, WiFi device, storage unit, ambient power, power outlets, and/or environmental sensors.

12. The system of claim 1 wherein the plurality of physical components comprise one or more of duct work, power channels, fire alarms, smoke detectors, and/or water pipes.

13. The system of claim 1 wherein the plurality of smart connectors further include at least one of: one or more sensors and/or one or more actuators.

14. The system of claim 1 wherein at least one of the plurality of smart connectors is a discrete unit that is distinct and separate from at least one of the plurality of physical components before the at least one the plurality of smart connectors is used to attach physical components to each other.

15. The system of claim 1 wherein the plurality of physical components and the plurality of smart connectors are responsive to logic instructions that analyze the detected state information from at least one of the plurality of physical components and use the analyzed information to reposition or to change a state of the one of the plurality of physical components by sending a command to the one of the plurality of physical components directly or indirectly.

16. The system of claim 15 wherein the analysis utilizes imported information from a building information model or a building energy model.

17. The system of claim 16 wherein the building information model or building energy model is provided from a source external to the building configuration and management system.

18. A method in a building configuration and management system for implementing automated control of a plurality of physical components of the building using a plurality of smart connectors, the plurality of physical components including a plurality of movable interior walls that are separate from a shell of a building and capable of being automatically repositioned, the plurality of physical components including one or more physical mating connectors structured to physically connect automatically to one or more other of the plurality of physical components in response to logic instructions, comprising:

receiving state information and an identification from one or more of the physical components and/or one or more of the smart connectors, the received state information including position information of at least some of the plurality of physical components;

analyzing the state information to determine a need to reposition or reconfigure, some of the plurality of physical components; and sending a command responsive to the analysis of the state information to some of the plurality of physical components to automatically reposition and/or reconfigure the some of the plurality of physical components by automatically attaching or reattaching the physical mating connectors of the some of the plurality of physical components.

19. The method of claim 18 wherein the command is sent directly to the one or more of the of the physical components through a control processor of one or more of the smart connectors.

20. The method of claim 18 wherein the action is to perform at least one of attachment and/or movement in a specified direction.

21. The method of claim 18 wherein the state information includes an indication of a presence or a position of an object external to the one or more physical components and/or the one or more smart connectors.

22. The method of claim 18 wherein the command causes a reconfiguration of the one or more physical components within a building interior.

* * * * *